United States Patent
Stockdale

[11] 4,137,429
[45] Jan. 30, 1979

[54] DIGITAL DIALERS FOR USE IN THE SECURITY FIELD

[75] Inventor: Roy Stockdale, Huntington, N.Y.

[73] Assignee: Napco Security Systems, Inc., Copiague, N.Y.

[21] Appl. No.: 810,930

[22] Filed: Jun. 29, 1977

[51] Int. Cl.$^2$ .......................................... H04M 11/04
[52] U.S. Cl. ................................................ 179/5 R
[58] Field of Search ..................... 179/5 P, 5 R, 2 A

[56] References Cited

U.S. PATENT DOCUMENTS

| | | | |
|---|---|---|---|
| 3,842,208 | 10/1974 | Paraskevakos | 179/5 R |
| 3,883,695 | 5/1975 | Bickel et al. | 179/5 R |
| 4,086,434 | 4/1978 | Bocchi | 179/5 R |

OTHER PUBLICATIONS

"Digital Circuits and Logic Design", Samuel C. Lee, (Prentice-Hall, 1976), pp. 164-168, 577.

*Primary Examiner*—Kathleen H. Claffy
*Assistant Examiner*—Kenneth A. Chayt
*Attorney, Agent, or Firm*—Arthur L. Plevy

[57] ABSTRACT

There is disclosed a digital dialing system operative to send a subscriber code and an alarm indication to a remote station via a communications link such as a telephone line. The digital dialer employs a memory which is preprogrammed to store a number of a central station to be dialed and which automatically transmits to that station when accessed, a code manifesting the location having the difficulty. The memory is further adapted to automatically transmit an additional signal indicative of the type of alarm condition such as a fire or a burglary which conditions are stored at predetermined locations in the memory. These memory locations are accessed by a memory address counter which is set at the end of a zone identification procedure by an alarm logic circuit. The dialer thus allows one to store a plurality of conditions indicative of different types of alarms to enable the central monitoring station to send or direct the proper equipment or authorities to the scene as the Fire Department, Police Department, and so on.

10 Claims, 2 Drawing Figures

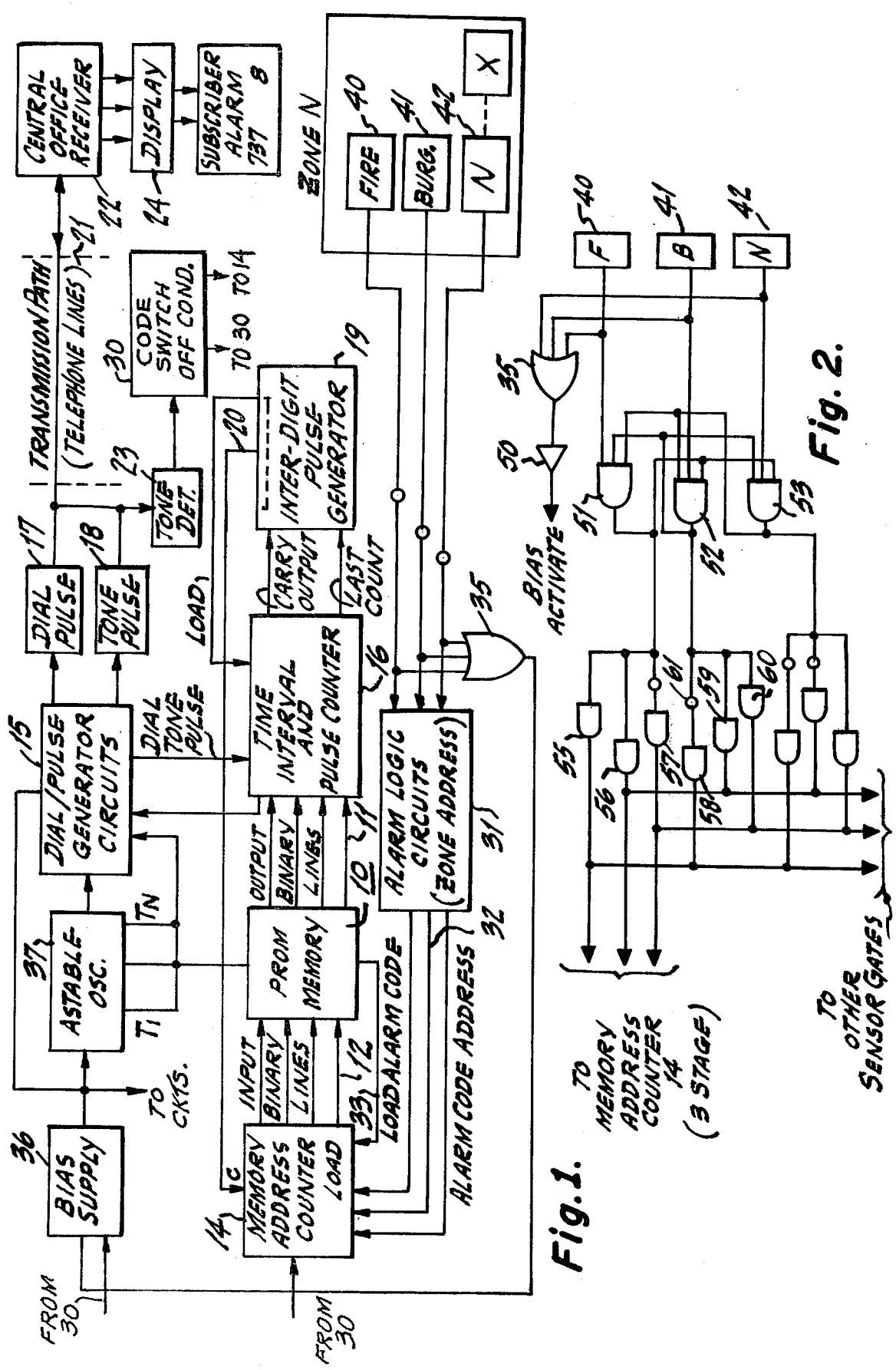

DIGITAL DIALERS FOR USE IN THE SECURITY FIELD

BACKGROUND OF THE INVENTION

This invention relates to an automatic telephone dialer and more particularly to such a dialer employing digital techniques.

Automatic telephone dialers of various types are well known in the art and have been widely used in fire and theft security systems. Many different types exist and, basically, function to dial a prerecorded telephone number and then send a notification of a fire or theft on the premises being monitored to the remote station or terminal.

Many of these devices employ prerecorded messages as well as telephone numbers on a magnetic tape associated with a transport. The units work in conjunction with existing telephone systems and are capable of dialing several different phone numbers and to supply information or emergency warnings regarding different types of panic situations such as fire, burglary, water or ph level. In any event, the use of such dialers in conjunction with magnetic tape also enables a prerecorded audible message to be transmitted to the remote location, such as a police station, firehouse and so on.

There also exists devices which are called digital dialers which are used to transmit a code over a telephone line. The remote station is also accessed by the unit which "dials" the remote station as indicated above and then transmits a particular code. The code is received at the remote location by a digital receiving device associated with the central location and which has a display consisting of appropriate digits to enable a user at the remote station to determine both the location and the nature of the emergency signal.

Thus, the digital dialer when activated, dials the telephone number of the central location and transmits to it a coded signal which is then decoded at the central location to indicate the subscriber and the type of alarm requested.

These digital dialers also perform other operations which were also implemented by the tape dialers. Thus such dialers may wait for a reply from the central station and disconnect if a reply is not received. These dialers will also disconnect and redial after the coded message is transmitted. Such dialers will attempt to dial the number until the message is acknowledged received and to further provide anti-jamming features to prevent someone from purposely tying up the telephone line.

In essence, such dialers do not transmit an audible signal such as the tape dialers, but do transmit an alarm code and as the tape dialers, can provide dial pulses for calling the remote station via a telephone line. There are many ways of programming the numbers such as the alarm code and the telephone numbers via such dialers. One technique employs a matrix which may mechanically store via a prewired system, a plurality of telephone numbers and the alarm codes. Each alarm code can be associated with a telephone number and hence, by means of patch cords or leads, one can then associate any alarm code with any particular number.

Certain dialers also use electronic memories in place of the matrix to store telephone numbers and alarm codes. These memories, of course, require a special programming or sequencing to control the memory. In any event, in employing such memories, there is a problem with the alarm code as to specify the particular type of alarm. Usually, a single dialer is connected to and monitors more than one zone. These zones may be different rooms in a building or different buildings.

Furthermore, the nature of the intrusion in each zone may be different. For example, one zone may be a fire zone, while the other zones may be burglar alarms and so on. In order to identify the zones at the remote location, it may be required that all fire alarms be represented by one number, all burglar alarms by another number and other conditions by an additional number. The dialer should also be capable of sending a test signal which may be still another number.

Such prior art dialers cannot progam the different alarm code number in the same location of memory for a particular zone. What is done is that an arbitary number such as 9, is programmed at a particular memory location associated with a particular zone. This digit of the memory location is inhibited prior to transmission over the telephone line and the proper digit representing a fire and so on is inserted.

Certain other systems, in order to circumvent this problem, employ an additional matrix whose main function is just to supply the alarm code. This matrix works in conjunction with a memory as well and is a hybrid system.

It is an object of the present invention to provide a digital dialer having the capability of programming any alarm code at a memory location at the same time as the telephone number is programmed. This therefore provides the user with greater flexibility, while providing an improved and more reliable dialing apparatus than those available in the prior art.

BRIEF DESCRIPTION OF PREFERRED EMBODIMENT

An automatic dialer is of the type adapted to access a communications channel such as a telephone line to first transmit via said line, a dialing code indicative of the location of a remote central station to supply said station upon accessing the same with a subscriber code address manifesting the location and condition of an alarm emanating from a monitored zone under surveillance; said zone including a plurality of alarm detectors each capable of responding to different alarm condition comprising a programmable, accessable memory having a plurality of storage locations, with a first group of said locations storing a code indicative of the location of said remote central station, a second group of storage locations having stored therein a code indicative of the subscriber address code associated with said monitored zone and a third group of storage locations having stored therein a plurality of codes each indicative of a particular alarm condition present at said monitored zone according to said alarm detectors; first means coupled to said memory to cause said memory to first provide at an output a first code associated with said first group of locations manifesting the location of said remote central station and means responsive to said code to provide a dialing format to said communications channel for accessing said station and means responsive to said first code being provided to provide a second code associated with said second group of locations for transmission to said remote station of a signal indicative of the address of said monitored zone; and means coupled to said memory and responsive to the transmission of said address signal to cause said memory to provide a third code associated with said third locations for transmission to said remote station of an alarm signal indicative of the particular type of alarm situation emanating from said monitored locations.

BRIEF DESCRIPTION OF FIGURES

FIG. 1 is a block diagram of a digital dialer according to this invention.

FIG. 2 is a logic diagram showing a sensor arrangement and an alarm logic circuit which may be employed according to this invention.

DETAILED DESCRIPTION OF FIGURES

Referring to FIG. 1, there is shown a block diagram of a digital dialer apparatus according to this invention.

Essentially, the main component which enables the transmission and control of information is a programmable read only memory module (PROM) 10. The memory 10 is preprogrammed with information which will determine the control sequences of the digital dialer as well as the timing periods and the numbers that the dialer will transmit over the telephone lines, as will be explained.

The PROM 10 has a number of output lines 11 and these output lines are capable of being addressed or accessed by employing a specific binary code to the input line 12 of the PROM. The address furnished to the PROM is supplied by a memory address counter 14. The counter 14 is capable of counting or providing an output for each of the memory input line conditions as required by the PROM.

The memory address counter 14 is advanced one count after each PROM output condition, as manifested by leads 11, has been accessed. The output of the memory 10 is used to control the various active circuits in the digital dialer such as the dial pulse generators circuits 15.

The memory 10 also provides an output which is used to address another counter 16. The counter 16, designated as a time interval and pulse counter, operates to count off specific time periods which are employed for determining time intervals in the dialer and for generating pulse code trains or data. These pulse trains are employed to open and close a dialing relay to enable the simulation of dialing to the telephone line for accessing a remote station and other pulse trains are employed to operate a tone generator to send a tone coded message on the telephone lines. The dial pulse circuit 17 and the tone pulse circuit 18 as coupled to the dial pulse generator circuits 15 are indicative of such operation.

Briefly, the programmable read only memory or PROM 10 is furnished or programmed with a specific number of predetermined bits at various locations. These program bits will be referred to in the specification as "words".

Essentially, each of the words constitute a specific instruction which will be completed during the countdown time of the time interval and pulse counter 16. At the end of the word time, interval counter 16 supplies a carry pulse to an inter-digit pulse generator 19. Generator 19 which may be a monostable multivibrator, provides a pulse of a specific duration; which pulse is applied to the memory address counter 14 via line 20 to cause the memory address counter to provide an output which operates to address the input lines 12 of the PROM 10.

The function of the inter-digit pulse generator 19 is to provide a space between the PROM outputs; which space is representative of the inter-digit pause during dial pulses or the space between successive tone code pulse trains.

The operation of the dialer is such that upon receipt of an alarm indication, as will be explained, the dialer is connected to the transmission path 21 or telephone lines. A suitable time is then generated to assure that a dial tone is received from the telephone system to thereby enable the dialer to commence dialing telephone numbers indicative of one or more remote central receiving locations such as 22.

When the central station 22 answers by returning a predetermined code, the dialer will then transmit a tone code sequence which will be decoded and displayed at the central office by means of an associated display module 24. The code as received and displayed will enable an operator at the central office 22 to recognize the particular type of alarm as emanating from a shown location.

The tone code sequence which is transmitted conventionally consists of three tone coded numbers which will describe the sender. A fourth tone coded number is employed to determine the nature of the alarm condition such as a fire, burglary and so on. With this type of coding, one can therefore employ up to 1,000 possible users on the same telephone line and up to ten (0-9) different alarm conditions.

Briefly, the present systems which employ a PROM have the three sender code numbers preprogrammed into a PROM, such as 10. The fourth zone code or alarm number is conventionally programmed as a fixed digit such as for example, 9. In the prior art systems, a module such as an alarm logic circuit modifies the output of the PROM to change the digit 9 for example, to another digit which manifests the particular type of alarm. Thus, the alarm logic circuits of the prior art are coupled directly to the output lines 11 of the PROM 10 and in conjunction with suitable gates or logic circuitry, will operate to modify the code number of the fourth tone to thereby assure that both the sender and alarm condition will be specified.

In the particular embodiment shown according to this invention, an alarm logic circuit 31 has outputs which are directed to the memory address counter 14. These output lines 32 from the alarm logic output circuits 31 furnish a location address which feeds and controls the data input or setting of the memory address counter 14. The operation of the circuit is as follows:

For a specific word as stored in the PROM 10 and immediately following the third tone code digit, a loading signal is supplied by the PROM 10 to the memory address counter 14 via line 33. This enables the memory address counter to load the particular binary number from the alarm logic circuit output lines 32. On the next clock pulse, this binary number on lines 32 sets the memory address counter 14 and hence, specifies at the output lines 12, a new address for the memory 10. At this address, the memory has stored therein a programmed number indicative of the particular alarm condition and that number or condition will be transmitted by the tone pulse circuit.

It can thus be seen that in this particular system the alarm logic circuit 31 is only responsible for furnishing a location to the PROM 10 via the memory address counter 14. Hence, the PROM 10 can be preprogrammed with any number that is required for any particular location.

As further indicated in FIG. 1, there is shown a zone N. The zone N for example, may be one of a plurality of zones or areas which are being monitored by the digital dialer of FIG. 1. The particular zone N may be a factory or a group of buildings having various locations which are monitored for fire by a sensor 40, for burglarly by a sensor 41, or for a hot or cold temperature condition by a sensor labelled N and referenced as 42, or by other sensors as water level, ph level, etc.

Hence, for any alarm condition in zone N, a signal is sent to the alarm logic circuits 31. Assume for example, there is a fire in a zone N, thus activating sensor 40. The output, which may be a ground level, is sent to the alarm logic circuit 31. The "OR" gate 35 is activated immediately as would occur for any alarm condition. The gate 35 activates the bias supply 36 to energize the dialer circuits to thus supply power to the digital dialer assembly. The dialer includes an oscillator circuit 37, which may be an astable or free-running multivibrator having a controllable frequency. Such circuits are well known and the frequency can be varied by changing the R-C time constant associated therewith.

The first sequence that occurs upon receipt of an alarm condition, is that the oscillator 37 is operated at a low rate say, for example, one-half second. The output of the oscillator 37 is divided by the dial pulse generator circuits 15 which divided output energizes the dial pulse circuit 17 to access or place a ground on the telephone line 21 indicating an "off-hook" status or a service request for a suitable period (say ten seconds or so).

It is thus assumed that the telephone system acknowledges the service request within this period and hence, transmits dial tone. The memory or PROM 10 is set to provide at its output, the first digit to be dialed at the end of this period. This digit (0-9) is then transferred via counter 16, to the dial pulse generator circuit 15. The oscillator 37 is switched to provide a higher repetition rate and its frequency again is divided by the generator 15 to employ a sixty to forty dial pulse ratio for each count of the first digit. Hence, if the first digit is an eight, then the telephone line would receive eight pulses at a sixty-forty on-off ratio, thus "dialing" an eight into the line 21. The dial pulse unit 17 may be a simple relay contact which would open and close eight times for this digit.

At the end of the first digit, a pulse is sent via line 40 to the time interval counter 16 which was initially set at a maximum count. The count of this counter 16 is then reduced by one. The reduction of the count of counter 16 by one, sends a carry pulse to the inter-digit generator 19. This generator then provides a predetermined duration pulse on line 20 which advances the memory address counter 14 by one. The count or code on lines 12 thus causes the PROM 10 to move to the next memory location or that location indicative of the output of the memory address counter 14 to thereby supply the next or second digit of the number to be dialed. This digit is then decoded by the time interval and pulse counter circuit 16 and is used to operate the dial pulse generator 15 and 17 to thus provide to the line 21, the proper digits and sequence indicative of the second number. The sequence above described continues until the proper number of digits indicative of the telephone number of the remote central station 22 is dialed.

This condition (dialing the correct number of digits) is stored in the PROM 10 which as described, is advanced by the address counter 14 for each digit of the dialed number. Hence, when the proper digits are dialed, the PROM 10 is at a location in memory having stored therein a code indicative of a completed dialing. This code is decoded by the time interval and pulse counter 16 which then provides in conjunction with the dial pulse circuit 15, a predetermined stand-by signal (twenty second duration).

This stand-by signal is necessary as the dialer expects an acknowledgement from the central office receiver 22. If an acknowledgement is received within the twenty seconds, this means that the central office has been accessed by the dialer. Central office receivers as 22 are well known in the art and many companies make units which can respond to an incoming telephone call and thus transmit back to the sending unit a tone or frequency indicative of the fact that the central office receiver 22 has been accessed. This tone is detected by a tone detector 23 located at the dialer location.

For present purposes, it is assumed that the initial dialing of the dialer caused the central office receiver 22 to be accessed and the aknowledgement tone was returned and detected by detector 23. The following sequence of events then occur: The detector 23 is coupled to a logic circuit 30 labelled CODE SWITCH-OFF conditioner. The circuit 30 advances the counter 14 to the tone code storage location.

At this location, there is stored a first digit indicative of the code associated with the subscriber monitored at zone N. This digit is then present at the output lines 11 of the PROM 10. The time interval and pulse counter 16 then activates the tone pulse generator 18 via the generator circuits 15 and causes a series of frequency pulses or tones to be transmittted to the central office receiver 22 via the telephone line 21. These frequency pulses are decoded at the receiver as indicative of the first subscriber digit. The PROM is advanced as indicated above by the inter-digit pulse generator and memory address counter so that the next two digits of the subscriber identification are transmitted. Hence, at the end of the sequence, the central officer will have three digits such as 712 or so on indicative of the address of the subscriber. At the end of the transmission of the last digit, the memory is now at a location which has stored therein a code which activates line 33 and causes the memory address counter 14 to change its state according to the code present on lines 32 as decoded by the alarm logic circuit. This code at the input to the memory address counter 14 thus moves the memory to a location indicative of the nature of the alarm which in this instance, would be a fire. The output manifesting fire condition from memory 10 is thus transmitted as a tone to the central office receiver 22 which then has the subscriber location as well as the nature of the problem. At the termination of this transmission, the memory and the time interval and pulse counter are automatically set so that the subscriber code and the alarm code are transmitted a desired number of times which may be for example, three or four or five more times to assure that the subscriber code and the alarm condition are received. Normally, the central receiver would acknowledge receipt of the signal by sending a tone signal back along the telephone line 21. If this signal is received by the tone detector 23, the entire dial pulse unit would be reset via the logic circuit 30 and would be ready for operation again.

In any event, it is important to note that the dialer thus described can in fact, implement any alarm code at any zone as a fire, burglary, medical, temperature and so on by the alarm code address setting the counter 14 to a proper memory location. This feature has great advantages over prior art systems in that any alarm condition can thus be stored in memory without additional circuitry necessary to insert the alarm condition at the output of the memory after it has been ascertained.

Generally, the above discussion concentrated on one zone N having a plurality of different alarm conditions indicated generally by sensors 40, 41 and 42. It should be obvious to those skilled in the art that another zone could also be accommodated very simply by storing in the PROM 10 a different zone number and by causing the PROM to proceed to this zone number after dialing. This can be implemented by a gate as 35 associated with the additional zone; which gate would prime the PROM 10 to indicate the nature of this zone.

The dialer, of course, provides other functions which will be briefly described and are immediately available based on the circuitry shown in the figure.

Essentially, the above discussion concentrated and was directed towards the immediate access of a telephone line after the inception of an alarm condition. In any event, it is readily apparent that the dialer may not be able to access the telephone line due to heavy traffic conditions or otherwise. In this event there would be no tone received by detector 23 during the twenty second period. If this occurs, the dialer will automatically disconnect from the telephone line or "hand-up" and will remain disconnected for another twenty second period. At the end of this period, the dialer will again access the telephone line, wait the predetermined period and commence dialing and the above described operation. The purpose of the twenty second "hang-up" time is to allow any calling party having access to line 21 to complete the message.

Furthermore, it has been indicated above that the dialer will repeat the tone code message a number of times and will automatically hang-up even though it does not receive an acknowledgement during that time. It is, of course, understood that if an acknowledgement is expected and not received, that the dialer can be reset to commence the dialing cycle a plurality of times until it will finally abandon efforts to contact the central station in the event of a telephone line failure and so on.

Many of the above described features concerning the disconnect and hang-up times are in fact, available in the prior art mechanisms but, of course, can be conveniently implemented according to the above described specification and in conjunction with the circuitry described herein.

The above described circuitry including the memory 10 and memory address counter 14 are well known in the art and can be implemented by anyone skilled or knowledgeable in the field of digital design. Suitable circuits are shown and techniques for controlling and providing dial pulses and so on are known in the literature. Reference may be had to a book entitled MICROPROCESSORS AND MICROCOMPUTERS by Branko Soucek published in 1976 by John Wiley & Sons to show the control and the application of PROMS and so on, as well as text entitled SEMICONDUCTOR MEMORY DESIGN AND APPLICATION by Texas Instruments published by McGraw Hill in 1973.

In any event, as above indicated, a major difference between this particular dialer and those existing is the ability to store in the memory, the nature of the alarm and to automatically access the location by indexing the memory via the memory address counter according to the alarm condition received from the zone.

Referring to FIG. 2, there is shown a simple circuit which would operate to set the memory address counter to any particular code according to the nature of the alarm.

The memory address counter 14 may, for example, comprise a multiple binary stage counter, thus capable of indicating 32,64,128 or 256 different states compatible with the PROM.

FIG. 2 shows the fire sensor 40, the burglar detector 41 and any other detector such as a thermostat panic button and so on 42. If any detector responds, assume a ground is present at the output. The first thing that occurs, of course, is that the OR gate 35 is activated which, as indicated above, applies bias to the dialer.

There is shown an additional gate 50 connected to gate 35. Gate 50 may be a power amplifier or relay driver or any other conventional circuit.

Let us assume for the present discussion as above, that a fire occurs at zone N and that sensor 40 thus supplies the ground or level indicating the alarm. An AND gate 51 associated with sensor 40 is automatically activated upon receipt of the signal. It is shown that one input of AND gate 51 is connected directly to 40, while the additional inputs are connected to the output of AND gates 52 and 53 associated with sensors 41 and 42. In this manner as will be explained, the only gate that can be activated would be 51 since sensor 40 is activated.

Gate 51 is coupled to three decoding gates for example, as shown as 55, 56 and 57. It is, of course, known that any logic equivalents or substitutions can be added in lieu of the arrangements shown which is done merely by way of explanation.

Thus, the outputs of gates 55 to 57 respond to the HIGH condition to thus present a 110 to the memory address counter 14 which would then cause the PROM 10 to be directed to the fire digit location after the three digit code indicative of the zone was transmitted, as described above.

Now let us assume that a burglary occurred and hence, sensor 41 was activated. In this case, gate 52 would be primed which would cause the output gates 58, 59 and 60 to send a 011 to the counter 14, thus indexing the memory to the burglary digit location. This is done as one can see, due to the fact that an extra inverter 61 is inserted.

It is noted that the output of gates 51, 52 and 53 are all used as an input to the respective gates.

Thus, the output of gate 51 is also coupled to gates 52 and 53. This will, of course, prevent multiple indications from occurring at the remote location to thus confuse the system. For example, as soon as the fire sensor 40 is activated, gates 52 and 53 are inhibited due to the high input of gate 51 and hence, it is thus assured that the central station will receive one indication from the zone that a fire exists and will immediately dispatch the necessary equipment or agency.

It is, of course, understood that based on many different types of logic implementation, that priority conditions could be wired into the system as for example, if there is a multiple intrusion at a site, then fire will have priority over burglary and so on.

It is further understood that each gate as 51 to 53 can itself be inhibited after the requisite code has been sent by the dialer logic circuitry to thereby enable the system to handle the next request after it has completed the priority request. Thus one could very simply, in the event of a multiple alarm condition, cause the dialer to first indicate to the central station that a fire exists on the premises and complete its routine. After the completion of this routine, gate 51 would be inhibited by the dialer and if a burglary also exists, sensor 41 would then cause gate 52 to initiate still another sequence again informing the central office that there is also a burglary condition at the zone. It is, of course, understood that based on normal security practices, that a fire indication would in essence, bring assistance at the zone being monitored which would in most instances, serve to circumvent the burglary which may be simultaneously present.

I claim:

1. A telephone dialer apparatus of the type adapted to access a telephone line to transmit a dialing code via said line indicative of the location of a remote central station and to supply said station upon accessing of the same with a subscriber code address manifesting the location and condition of an alarm emanating from a monitored zone under surveillance, said zone including a plurality of alarm detectors, each capable of responding to a different alarm situation, comprising:
   (a) a programmable accessible memory having a plurality of storage locations, with a first group of said locations storing a code indicative of the location of said remote central station, a second group of storage locations having stored therein a code indicative of the subscriber address code associated with said monitored zone, and a third group of storage locations having stored therein a plurality of codes, each indicative of a particular alarm condition present at said monitored zone, according to said detectors,
   (b) first means coupled to said memory to cause said memory to first provide an output a first code associated with said first group of locations manifesting the location of said remote central station and means responsive to said code to provide a dialing format to said telephone line for accessing said central station,
   (c) logic means coupled to said memory and responsive to said first code being provided to cause said memory to provide a second code associated with said second group of locations for transmission to said remote station of a signal indicative of the address of said monitored zone, and
   (d) means coupled to said memory and responsive to the transmission of said address signal to cause said memory to provide a third code associated with said third locations for transmission to said remote station an alarm signal indicative of the particular type of alarm situation emanating from said monitored location.

2. The dialer according to claim 1 wherein said first means includes a counter coupled to said memory and capable of providing at an output a plurality of codes indicative of said first, second or third storage locations.

3. The dialer according to claim 2 further including means coupled to said counter and operative to select any one of said plurality of codes to thereby cause said memory to provide any desired one of first, second or third codes.

4. The dialer according to claim 1 wherein said monitored zone includes at least one sensor capable of providing an alarm condition indicative of a fire and another sensor capable of providing an alarm condition indicative of an intrusion.

5. The dialer according to claim 4 further including logic means coupled to said one and another sensor to provide at an output, a code adapted to access said memory to provide said code associated with one of said third storage locations according to the sensor which is indicating said condition.

6. The dialer apparatus according to claim 1 further comprising timing means coupled to said memory and operative to sequence said memory to cause said memory to provide said first, second or third codes in a predetermined sequence as controlled by said timing means.

7. The dialer according to claim 1 wherein said first means further include an inter-digit generator operative to access said memory at successive locations within said first group of locations.

8. The dialer according to claim 4 further including means coupled to said sensors adapted to provide a control signal indicative of the operation of any one sensor indicating an alarm condition and means responsive to said control signal for accessing said telephone line.

9. The dialer apparatus according to claim 1 wherein said memory is programmable read only memory having a plurality of addressable input lines and a plurality of output lines, said output lines capable of providing said code associated with said first, second or third locations when a unique address code is applied to said input lines, and means coupled to said input lines for generating a plurality of addresses each associated with a different one of said locations.

10. The dialer apparatus according to claim 6 further including means coupled to said timing means and operative to control the duration of said sequence and therefore the duration at which said memory supplies said first code as compared to said second code as compared to said third code.

* * * * *